United States Patent
Li

(10) Patent No.: US 11,757,517 B2
(45) Date of Patent: Sep. 12, 2023

(54) DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 45 days.

(21) Appl. No.: 17/433,218

(22) PCT Filed: Feb. 22, 2019

(86) PCT No.: PCT/CN2019/075909
§ 371 (c)(1),
(2) Date: Aug. 23, 2021

(87) PCT Pub. No.: WO2020/168556
PCT Pub. Date: Aug. 27, 2020

(65) Prior Publication Data
US 2022/0123818 A1 Apr. 21, 2022

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/088* (2013.01);
(Continued)

(58) Field of Classification Search
CPC .... H04B 7/0695; H04B 7/0408; H04B 7/088; H04B 7/0691; H04B 7/0404;
(Continued)

(56) References Cited

U.S. PATENT DOCUMENTS 9,014,131 B2  4/2015  Yang et al.
9,167,577 B2  10/2015  Yang et al.
(Continued)

FOREIGN PATENT DOCUMENTS

CN  103687019 A  3/2014
CN  107135021 A  9/2017
(Continued)

OTHER PUBLICATIONS

English translation of the Written Opinion of the International Search Authority in the International Application No. PCT/CN2019/075909, dated Nov. 4, 2019, (6p).
(Continued)

*Primary Examiner* — Kenneth T Lam
(74) *Attorney, Agent, or Firm* — Arch & Lake LLP

(57) ABSTRACT

A method and apparatus, and a storage medium for data transmission are provided. The method may be applied to a terminal. The terminal may receive a Media Access Control (MAC) signaling sent from a base station. The terminal may receive Downlink Control Information (DCI) sent from a base station. The terminal may search in a preset mapping corresponding to n antenna panels for beam indication information corresponding to a beam indication code word as target beam indication information respectively corresponding to the n antenna panels. The terminal may determine, according to the target beam indication information corresponding to a target antenna panel, a corresponding target beam when data transmission is performed by using the target antenna panel. The terminal may perform data transmission with the base station by using the target beam corresponding to the target antenna panel.

20 Claims, 4 Drawing Sheets

(51) Int. Cl.
  *H04B 7/08* (2006.01)
  *H04L 1/00* (2006.01)
  *H04W 72/044* (2023.01)
  *H04W 72/23* (2023.01)

(52) U.S. Cl.
  CPC ......... *H04L 1/0023* (2013.01); *H04W 72/046* (2013.01); *H04W 72/23* (2023.01)

(58) Field of Classification Search
  CPC .. H04L 1/0023; H04W 72/046; H04W 72/23; H04W 16/28
  See application file for complete search history.

(56) References Cited

U.S. PATENT DOCUMENTS

| | | | |
|---|---|---|---|
| 9,300,441 | B2 | 3/2016 | Yang et al. |
| 9,854,575 | B2 | 12/2017 | Yang et al. |
| 10,952,231 | B2 * | 3/2021 | Liou ............ H04W 72/23 |
| 2016/0105817 | A1 | 4/2016 | Frenne et al. |
| 2016/0192290 | A1 | 6/2016 | Joung et al. |
| 2018/0206132 | A1 * | 7/2018 | Guo ............ H04B 7/0404 |
| 2018/0309490 | A1 * | 10/2018 | Rahman ............ H04B 7/0482 |
| 2019/0044587 | A1 | 2/2019 | Rahman et al. |
| 2019/0045494 | A1 * | 2/2019 | Ho ............ H04W 72/046 |
| 2019/0182898 | A1 | 6/2019 | Yu et al. |
| 2019/0261202 | A1 | 8/2019 | Tang et al. |
| 2019/0297603 | A1 | 9/2019 | Guo et al. |
| 2019/0306850 | A1 | 10/2019 | Zhang et al. |
| 2020/0137592 | A1 | 4/2020 | Guo et al. |
| 2020/0220597 | A1 | 7/2020 | Rahman et al. |
| 2021/0384951 | A1 | 12/2021 | Li |
| 2022/0123818 | A1 | 4/2022 | Li |
| 2022/0190902 | A1 * | 6/2022 | Zhang ............ H04W 56/001 |
| 2022/0417767 | A1 * | 12/2022 | Li ............ H04B 7/0404 |

FOREIGN PATENT DOCUMENTS

| | | |
|---|---|---|
| CN | 107528678 A | 12/2017 |
| CN | 108377559 A | 8/2018 |
| CN | 109076560 A | 12/2018 |
| CN | 109150453 A | 1/2019 |
| CN | 109314561 A | 2/2019 |
| CN | 109315009 A | 2/2019 |
| CN | 109788546 A | 5/2019 |
| CN | 109845371 A | 6/2019 |
| CN | 109983797 A | 7/2019 |
| CN | 109983823 A | 7/2019 |
| EP | 3930365 A1 | 12/2021 |
| EP | 3930366 A1 | 12/2021 |
| JP | 2020523912 A | 8/2020 |
| KR | 20180018430 A | 2/2018 |
| RU | 2562244 C2 | 9/2015 |
| WO | 2017192889 A1 | 11/2017 |
| WO | 2018131945 A1 | 7/2018 |
| WO | 2018183991 A1 | 10/2018 |
| WO | 2018231141 A1 | 12/2018 |
| WO | 2018232283 A1 | 12/2018 |
| WO | 2019027226 A1 | 2/2019 |
| WO | 2019029515 A1 | 2/2019 |

OTHER PUBLICATIONS

First Office Action of the Chinese Application No. 201980000191.2, dated Aug. 4, 2021 with English translation, (17p).
First Office Action of the Russian Application No. 2021127566, dated Apr. 29, 2022, (18p).
First Office Action of the Korean application No. 10-2021-7030118, dated Aug. 16, 2022, with English translation, (15p).
Supplementary European Search Report in the European application No. 19916201.7, dated Aug. 31, 2022, (10p).
CATT, "Enhancements on multi-beam operation", 3GPP TSG RAN WG1#95 R1-1812636, Spokane, USA, Nov. 12-16, 2018, (9p).
Vivo, "Discussion on Multi-Beam Operation", 3GPP TSG RAN WG1 Ad-Hoc Meeting 1901,R1-1900138, Taipei, Jan. 21-25, 2019,(10p).
First Office Action of the Japanese application No. 2021-549336, dated Sep. 9, 2022,with English translation,(6p).
First Office Action of the Chinese application No. 201980002937.3, dated Oct. 14, 2022.
Extended European Search Report in the European application No. 19952003.2, dated Oct. 4, 2022.
Office Action of the Indian Application No. 202247031749, dated Sep. 15, 2022, (6p).
International Search Report in the international application No. PCT/CN2019/116064, dated Jul. 20, 2020, (3p).
English translation of the Written Opinion of the International Search Authority in the international application No. PCT/CN2019/116064, dated Jul. 20, 2020, (3p).
OPPO, "Discussion on Multi-beam Operation Enhancements", 3GPP TSG RAN WG1 #96, R1-1904038, Apr. 12, 2019 (Apr. 12, 2019), (9p).
International Search Report of PCT Application No. PCT/CN2019/075909 dated Nov. 4, 2019 with English translation, (4p).
Vivo, "Discussion on beam measurement,beam reporting and beam indication", 3GPP TSG RAN WG1 Meeting #90bis R1-1717472, Oct. 9-13, 2017, (12p).
Guangdong OPPO Mobile Telecom., "Beam association relationship between data and control channels", 3GPP TSG RAN WG1 Meeting 89 R1-1707699, May 15-19, 2017, (2p).

* cited by examiner

DATA TRANSMISSION METHOD AND APPARATUS, AND STORAGE MEDIUM

CROSS-REFERENCE TO RELATED APPLICATION

The application is the national stage of International Application No. PCT/CN 2019/075909, filed on Feb. 22, 2019, the disclosure of which is hereby incorporated by reference in its entirety for all purposes.

TECHNICAL FIELD

Embodiments of the present disclosure relate to the field of communication technologies, and in particular to a data transmission method and apparatus, and a storage medium.

BACKGROUND

In a 5G New Radio (NR) system, a base station and a terminal may send and receive information by using a beam. For example, control signaling and service data exchanged between the base station and the terminal may be transmitted and received by using beams.

When the base station and/or the terminal have multiple antenna panels, data transmission can be performed between the base station and the terminal through beams on different antenna panels. Taking transmission of downlink data as an example, when the base station has multiple antenna panels, the base station may send downlink data to the terminal through different antenna panels, that is, send downlink data to the terminal through transmitting beams in different directions. Accordingly, the terminal may use receiving beams on different antenna panels to receive downlink data sent from the base station through transmitting beams on different antenna panels.

For a multi-antenna panel scenario, if a transmitting beam and a receiving beam used between a base station and a terminal do not match, an error in data reception may be caused and a success rate of data transmission may be affected.

SUMMARY

Embodiments of the present disclosure provide a data transmission method and apparatus, and storage medium. The technical solutions are as follows.

According to a first aspect of the present disclosure, there is provided a method for data transmission. The method may be applied to a terminal. The terminal may receive Media Access Control (MAC) signaling sent from a base station. The MAC signaling may be configured to activate beam indication information respectively corresponding to n antenna panels. The beam indication information corresponding to one of the n antenna panels may be configured to indicate a corresponding beam when data transmission is performed by using the antenna panel. The MAC signaling may include an information element configured to instruct the terminal to activate the n antenna panels. The n is a positive integer. The terminal may receive Downlink Control Information (DCI) sent from the base station. The DCI may include a beam indication codeword which may be configured to indicate target beam indication information respectively corresponding to the n antenna panels. The n antenna panels may include the target beam indication information corresponding to a target antenna panel and may be one of multiple beam indication information corresponding to the target antenna panel activated by the MAC signaling. The terminal may search in a preset mapping relationship corresponding to the n antenna panels for beam indication information corresponding to the beam indication codeword as the target beam indication information respectively corresponding to the n antenna panels. The terminal may determine, according to the target beam indication information corresponding to the target antenna panel, a corresponding target beam when data transmission is performed by using the target antenna panel. The terminal may perform data transmission with the base station by using the target beam corresponding to the target antenna panel.

According to a second aspect of an embodiment of the present disclosure, there is provided a method for data transmission. The method may be applied to a base station. The base station may send MAC signaling to a terminal. The MAC signaling may be configured to activate beam indication information respectively corresponding to n antenna panels. The beam indication information corresponding to one of the n antenna panels may be configured to indicate a corresponding beam when data transmission is performed by using the antenna panel. The MAC signaling may include an information element configured to instruct the terminal to activate the n antenna panels. The n is a positive integer. The base station may send DCI to the terminal. The DCI may include a beam indication codeword that may be configured to indicate target beam indication information respectively corresponding to the n antenna panels. The n antenna panels may include target beam indication information corresponding to a target antenna panel that may include one of multiple beam indication information corresponding to the target antenna panel activated by the MAC signaling. The base station may perform data transmission with the terminal by using the n antenna panels.

According to a third aspect of an embodiment of the present disclosure, there is provided an apparatus. The apparatus may include one or more processors and a non-transitory computer-readable storage medium storing instructions executable by the one or more processors. The one or more processors may be configured to receive Media Access Control (MAC) signaling sent from a base station. The MAC signaling may be configured to activate beam indication information respectively corresponding to n antenna panels. The beam indication information corresponding to one of the n antenna panels may be configured to indicate a corresponding beam when data transmission is performed by using the antenna panel. The MAC signaling may include an information element configured to instruct the terminal to activate the n antenna panels. The n is a positive integer. The one or more processors may also be configured to receive Downlink Control Information DCI sent from the base station. The DCI may include a beam indication codeword that may be configured to indicate target beam indication information respectively corresponding to the n antenna panels. The n antenna panels may include target beam indication information corresponding to a target antenna panel that may include one of multiple beam indication information corresponding to the target antenna panel activated by the MAC signaling. The one or more processors may also be configured to search in a preset mapping relationship corresponding to the n antenna panels for beam indication information corresponding to the beam indication codeword as the target beam indication information respectively corresponding to the n antenna panels. The one or more processors may also be configured to determine, according to the target beam indication information corresponding to the target antenna panel, a corresponding target beam when data transmission is performed by using the target antenna panel. The one or more processors may also be configured to perform data transmission with the base station by using the target beam corresponding to the target antenna panel.

It is to be understood that the above general description and the following detailed description are exemplary and explanatory only and do not limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

The network architecture and service scenarios described in the embodiments of the present disclosure are intended to explain the technical solutions of the embodiments of the present disclosure more clearly, and do not constitute a limitation on the technical solutions provided by the embodiments of the present disclosure. A person of ordinary skill in the art will appreciate that the technical solutions provided in the embodiments of the present disclosure are equally applicable to similar technical problems with the evolution of the network architecture and the emergence of new service scenarios.

Figure 1:
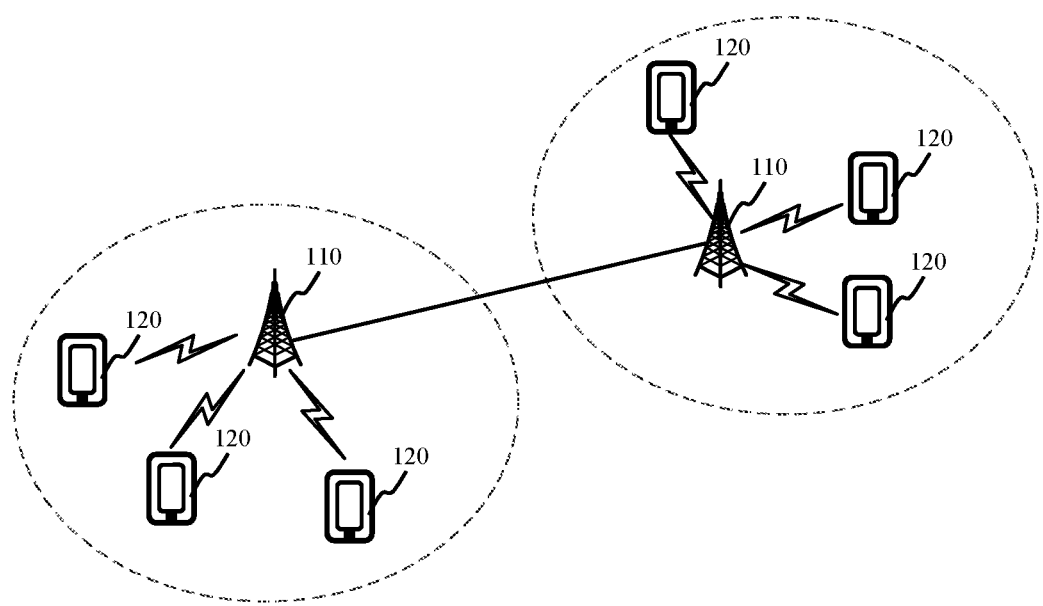
FIG. 1 is a schematic diagram of a network architecture according to an embodiment of the disclosure.

FIG. 1 is a schematic diagram of a network architecture according to an embodiment of the disclosure. The network architecture may include a base station 110 and a terminal 120.

The base station 110 is deployed in an access network. An access network in a 5G NR system may be referred to as a New Generation-Radio Access Network (NG-RAN). The base station 110 and the terminal 120 communicate with each other by a certain air interface technology, for example, by cellular technology.

The base station 110 is an apparatus deployed in an access network for providing a wireless communication function for the terminal 120. The base station 110 may include various forms of micro base stations, micro base stations, relay stations, access points, and the like. In systems employing different radio access technologies, the names of devices having the function of the base station may vary, for example, in 5G NR systems, the base station is referred to as gNodeB or gNB. As communication technologies evolve, the term "base station" may change. For convenience of description, in the embodiments of the present disclosure, the above-described apparatus for providing a wireless communication function for the terminal 120 is collectively referred to as a base station.

The number of terminals 120 is typically multiple and one or more terminals 120 may be distributed within a cell managed by each base station 110. The terminal 120 may include various devices having wireless communication functions, such as handheld devices, vehicle-mounted devices, wearable devices, computing devices, or other processing devices connected to a wireless modem, as well as various forms of User Equipments (UEs), Mobile Stations (MSs), terminal devices, and the like. For convenience of description, in embodiments of the present disclosure, the above-described devices are collectively referred to as terminals.

The "5G NR system" in embodiments of the present disclosure may also be referred to as a 5G system or an NR system, but a person skilled in the art may understand the meaning thereof. The technical solutions described in the embodiments of the present disclosure may be applied to a 5G NR system, or may be applied to a subsequent evolution system of the 5G NR system.

In a case where a single antenna panel sends a Physical Downlink Shared Channel (PDSCH), the base station may indicate the receiving beam to the terminal in such a manner: the base station informs the terminal of multiple TCI states (for example, a maximum of 64 TCI states or 128 TCI states) through Radio Resource Control (RRC) signaling; then, the base station activates several (e.g., up to 8) TCI states of the multiple TCI states by using MAC signaling, and then the base station informs the terminal through DCI which one of the several activated TCI states is to be used for receiving the PDSCH. The TCI state informed through the DCI is transmission state configuration of the PDSCH configured by the base station for the terminal, that is, informing the terminal that the receiving beam used by the terminal when receiving the downlink data on the PDSCH should be the same as the receiving beam used by the terminal when the terminal receives a Reference Signal (RS) corresponding to the TCI state. Thereafter, the terminal may receive the downlink data on the PDSCH by using the determined receiving beam.

Each TCI state corresponds to an RS identifier, also referred to as RS index, configured to uniquely indicate the RS. Different RSs have different RS identifiers. In the embodiments of the present disclosure, The RS may be Non-Zero Power Channel State Information Reference Signal, non-zero power channel state information reference signal (NZP CSI-RS), Synchronization Signal Block (SSB), or any other reference signal, which are not limited in the embodiments of the present disclosure. Exemplary correspondences between the TCI state and the RS identifier are shown in Table-1:

TABLE 1

| TCI state | RS index |
|---|---|
| TCI#0 | SSB index#1 |
| TCI#1 | SSB index#2 |
| TCI#2 | CSI-RS index#5 |

TABLE 1-continued

| TCI state | RS index |
|---|---|
| TCI#3 | CSI-RS index#6 |
| TCI#4 | SSB index#3 |
| ... | ... |

Assuming that the base station informs the terminal to use the TCI #0 through the DCI, it means that the terminal is informed to use the receiving beam used when receiving the SSB index #1, to receive the PDSCH. This may imply that the base station sends PDSCHs of this period to the terminal by using a transmitting beam for sending the SSB index #1, and when receiving the PDSCHs during this period, it is best for the terminal to use the same receiving beam as that for the SSB index #1.

For a multi-antenna panel scenario, the base station may have multiple antenna panels. The base station may send the downlink data to the terminal through the transmitting beams on the multiple antenna panels, or may receive the uplink data sent from the terminal through the receiving beams on multiple antenna panels. The multiple antenna panels may belong to a same Transmitter Receiver Point (TRP), or may belong to multiple different TRPs. That is, one base station may have one or more TRPs, each TRP may have one or more antenna panels, and different antenna panels correspond to different beam directions.

Similarly, the terminal may have multiple antenna panels. The terminal may receive the downlink data sent from the base station through receiving beams on multiple antenna panels, or may send the uplink data to the base station through transmitting beams on multiple antenna panels. Different antenna panels correspond to different beam directions.

Taking transmission of downlink data as an example, the base station may semi-statically switch the antenna panel that is configured to send PDSCH for the same terminal. For example, the base station has two antenna panels: panel #1 and panel #2, and the base station sends a PDSCH to a certain terminal by using the panel #1 for a period of time, then the beam indication codeword included in the DCI for the period of time indicates a TCI state on the panel #1. If the base station does not inform the terminal that the antenna panel used for receiving the PDSCH is panel #1, a problem occurs that the transmitting beam and the receiving beam used respectively by the base station and the terminal do not match, so that an error in data reception may be caused and a success rate of data transmission may be affected. Similarly, the same problem can occur in transmission of uplink data.

In the technical solutions provided by the present disclosure, for a multi-antenna panel scenario, the base station sends MAC signaling and DCI to the terminal, so as to indicate, to the terminal, a corresponding target beam to be used when the target antenna panel is used in the data transmission, so that the terminal can select correct beams to perform data transmission for different antenna panels, thereby improving the success rate of data transmission in the multi-antenna panel scenario. Thereinafter, the technical solutions provided by the present disclosure will be described by several embodiments.

Figure 2:
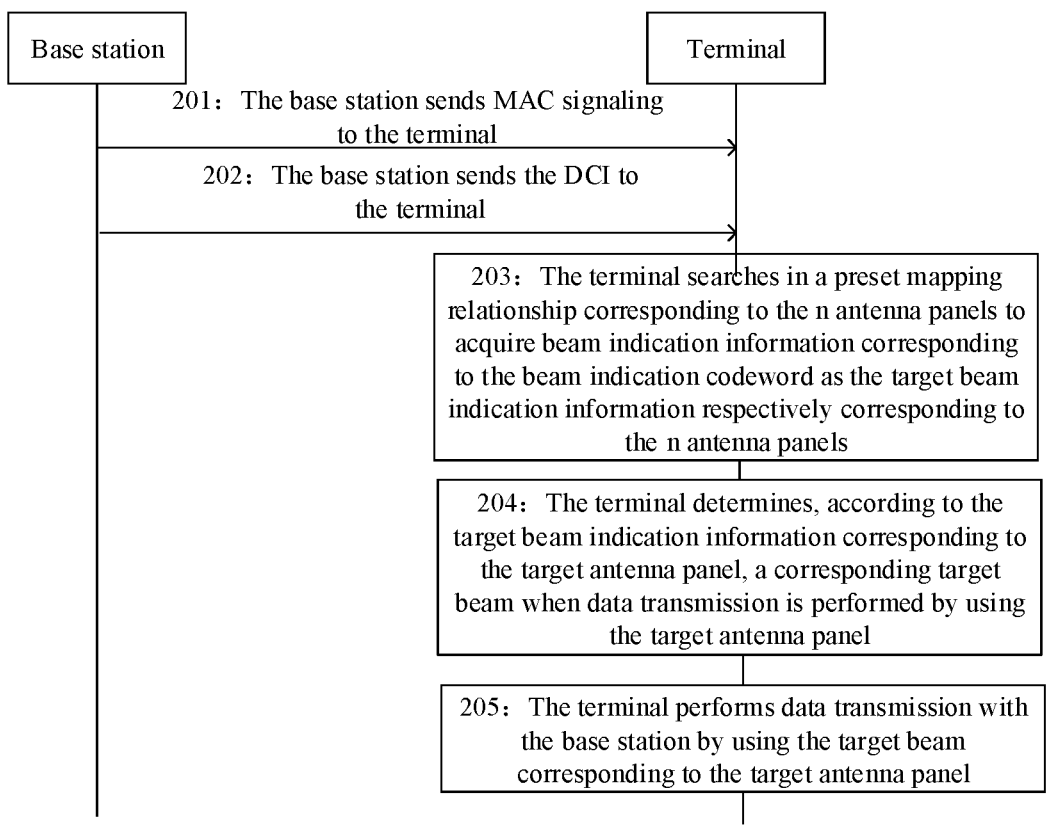
FIG. 2 is a flowchart of a data transmission method according to an embodiment of the disclosure.

FIG. 2 is a flowchart of a data transmission method according to an embodiment of the disclosure. The method can be applied to the network architecture shown in FIG. 1. The method may include the following steps operations (201-205).

In operation 201, the base station sends MAC signaling to the terminal.

In the embodiments of the present disclosure, the MAC signaling is configured to activate beam indication information respectively corresponding to n antenna panels, where n is a positive integer. Optionally, the terminal includes multiple antenna panels, and MAC signaling is configured to activate beam indication information corresponding to all or some of the antenna panels of the terminal, respectively. For example, the terminal includes two antenna panels, which are panel #1 and panel #2, respectively. The MAC signaling sent from the base station to the terminal is configured to activate the beam indication information corresponding to the panel #1, or to activate the beam indication information corresponding to the panel #2, or to activate the beam indication information corresponding to the panel #1 and the panel #.

Beam indication information corresponding to one of the n antenna panels is configured to indicate a corresponding beam when data transmission is performed by using the antenna panel. In one example, the beam indication information is a TCI state, and a TCI state corresponding to the target antenna panel is configured to indicate a receiving beam used by the terminal when the terminal receives downlink data by using the target antenna panel. In another example, the beam indication information is SRI, and SRI corresponding to the target antenna panel is configured to indicate a transmitting beam used by the terminal when the terminal sends uplink data by using the target antenna panel.

The MAC signaling includes an information element configured to instruct the terminal to activate the n antenna panels. Assuming that the terminal includes two antenna panels, which are panel #1 and panel #2, respectively, the information element may be represented by 2 bits. Exemplarily, if the information element included in the MAC signaling is 00, the terminal is instructed to activate the panel #1; if the information element included in the MAC signaling is 01, the terminal is instructed to activate panel #2; and if the information element included in the MAC signaling is 10, the terminal is instructed to activate panel #1 and panel #2.

In an embodiment of the present disclosure, the base station may semi-statically switch an antenna panel used for data transmission. That is, the base station switches the antenna panel under a certain trigger condition, and the antenna panel after the switching may remain unchanged for a period of time. In an embodiment of the present disclosure, the activated n antenna panels indicated by the MAC signaling are to-be-used antenna panels determined by the base station after the semi-static switching. For example, the terminal includes two antenna panels which are panel #1 and panel #2. The currently used antenna panel is panel #1, after the semi-static switching, the base station decides to use panel #1 and panel #2, in this case, the information element included in the MAC signaling sent from base station to the terminal is configured to instruct the terminal to activate the panel #1 and panel #2.

In addition, the antenna panel indicated by the information element may be represented an identifier of the antenna panel. For example, the identifier of the antenna panel may be represented by a panel ID, and different antenna panels are assigned with different panel IDs correspondingly. Alternatively, the identifier of the antenna panel may be represented by identification information of an RS, which may be SSB, NZP CSI-RS or Sounding Reference Signal (SRS).

In an embodiment, taking a transmission of downlink data as an example, the terminal includes two antenna panels, which are panel #1 and panel #2, respectively. If the base station determines to activate the panel #1, the information element included in the MAC signaling sent from the base station to the terminal is 00, and the MAC signaling indicates multiple (e.g., eight) TCI states corresponding to the panel #1, such as including TCI #0, TCI #3, TCI #6, TCI #14, TCI #20, TCI #23, TCI #26 and TCI #44. If the base station determines to activate the panel #2, the information element included in the MAC signaling sent from the base station to the terminal is 01, and the MAC signaling indicates multiple (e.g., eight) TCI states corresponding to the panel #2, such as including TCI #(N+1), TCI #(N+4), TCI #(N+7), TCI #(N+12), TCI #(N+21), TCI #(N+24), TCI #(N+37) and TCI #(N+42). If the base station determines to activate the panel #1 and the panel #2, the information element included in the MAC signaling sent from the base station to the terminal is 10, and the MAC signaling indicates multiple (e.g., eight) TCI states corresponding to the panel #1, such as including TCI #0, TCI #3, TCI #6, TCI #14, TCI #20, TCI #23, TCI #26 and TCI #44, and indicates multiple (e.g., eight) TCI states corresponding to the panel #2, such as including TCI #(N+1), TCI #(N+4), TCI #(N+7), TCI #(N+12), TCI #(N+21), TCI #(N+24), TCI #(N+37) and TCI #(N+42), where the value of N may be 0, 64, or 128.

In addition, before sending the MAC signaling to the terminal, the base station sends the RRC signaling to the terminal, and informs the terminal of the multiple beam indication information corresponding to the multiple antenna panels through the RRC signaling. The beam indication information corresponding to the target antenna panel activated by the MAC signaling is some of multiple beam indication information corresponding to the target antenna panel informed in the RRC signaling. For example, in the RRC signaling, the terminal is informed of the 64 TCI states corresponding to the panel #1 and the 64 TCI states corresponding to the panel #2, and then the MAC signaling activates the eight TCI states corresponding to the panel #1 and/or the eight TCI states corresponding to the panel #2. The eight TCI states corresponding to the panel #1 activated by the MAC signaling are eight of the 64 TCI states corresponding to the panel #1 informed in the RRC signaling, and the eight TCI states corresponding to the panel #2 activated by the MAC signaling are eight of the 64 TCI states corresponding to the panel #2 informed in the RRC signaling.

It is to be noted that when the value of N is 0 and the TCI states corresponding to panel #1 and panel #2 are configured, the panel corresponding to the informed TCI state needs to be indicated in the RRC signaling, that is, whether the informed TCI state belongs to panel #1 or panel #2 needs to be indicated. When the value of N is 64, the TCI state with a number less than 64 corresponds to panel #1, and the TCI state with a number greater than or equal to 64 corresponds to panel #2. In the RRC signaling, the correspondences between the TCI states and the panels may be not additionally indicated. When the value of N is 128, the TCI state with a number less than 128 corresponds to panel #1, and the TCI state with a number greater than or equal to 128 corresponds to panel #2. In the RRC signaling, the correspondences between the TCI states and the panels may be not additionally indicated.

In operation 202, the base station sends the DCI to the terminal.

In an embodiment of the present disclosure, the DCI includes a beam indication codeword. The beam indication codeword may be a binary character string and configured to indicate target beam indication information respectively corresponding to the n antenna panels. For example, if the MAC signaling activates multiple TCI states corresponding to the panel #1, then a beam indication codeword in the DCI signaling is configured to indicate a target TCI state corresponding to the panel #1; if MAC signaling activates multiple TCI states corresponding to the panel #2, then a beam indication codeword in the DCI signaling is configured to indicate a target TCI state corresponding to the panel #2; and if the MAC signaling activates multiple TCI states corresponding to the panel #1 and the panel #2, respectively, then the beam indication codeword in the DCI signaling is configured to indicate the target TCI state corresponding to the panel #1 and the target TCI state corresponding to the panel #2.

In addition, the target beam indication information corresponding to a target antenna panel included in the n antenna panels is one of multiple beam indication information corresponding to the target antenna panel activated by the MAC signaling. Taking panel #1 as an example, in combination with the above examples, the TCI states corresponding to the panel #1 activated by the MAC signaling include TCI #0, TCI #3, TCI #6, TCI #14, TCI #20, TCI #23, TCI #26 and TCI #44. The target TCI state corresponding to the panel #1 indicated by the beam indication codeword in the DCI signaling may be one of the eight TCI states above, such as TCI #0.

In operation 203, the terminal searches in a preset mapping relationship corresponding to the n antenna panels to acquire beam indication information corresponding to the beam indication codeword as the target beam indication information respectively corresponding to the n antenna panels.

The preset mapping relationship is configured to represent correspondences between beam indication codewords and beam indication information. Optionally, the preset mapping relationship may be set in advance, and stored in the terminal and the base station in the form of a table.

Optionally, the terminal includes a first antenna panel and a second antenna panel, which are denoted as panel #1 and panel #2. In a possible implementation, the terminal stores a first preset mapping relationship corresponding to the first antenna panel, a second preset mapping relationship corresponding to the second antenna panel and a third preset mapping relationship corresponding to the first antenna panel and the second antenna panel. Any beam indication codeword in the first preset mapping relationship is configured to indicate target beam indication information corresponding to the first antenna panel. Any beam indication codeword in the second preset mapping relationship is configured to indicate target beam indication information corresponding to the second antenna panel. Any beam indication codeword in the third preset mapping relationship is configured to indicate the target beam indication information corresponding to the first antenna panel and the target beam indication information corresponding to the second antenna panel.

For example, a length of the beam indication codeword is 3 bit, and the beam indication information is a TCI state. The first preset mapping relationship may be exemplified as shown in Table-2.

TABLE 2

| Beam indication codeword | TCI state number |
|---|---|
| 000 | a first TCI state among the activated TCI states of the Panel#1 |
| 001 | a second TCI state among the activated TCI states of the Panel#1 |
| 010 | a third TCI state among the activated TCI states of the Panel#1 |
| 011 | a fourth TCI state among the activated TCI states of the Panel#1 |
| 100 | a fifth TCI state among the activated TCI states of the Panel#1 |
| 101 | a sixth TCI state among the activated TCI states of the Panel#1 |
| 110 | a seventh TCI state among the activated TCI states of the Panel#1 |
| 111 | an eighth TCI state among the activated TCI states of the Panel#1 |

The second preset mapping relationship may be exemplified as shown in Table-3.

TABLE 3

| Beam indication codeword | TCI state number |
|---|---|
| 000 | a first TCI state among the activated TCI states of the Panel#2 |
| 001 | a second TCI state among the activated TCI states of the Panel#2 |
| 010 | a third TCI state among the activated TCI states of the Panel#2 |
| 011 | a fourth TCI state among the activated TCI states of the Panel#2 |
| 100 | a fifth TCI state among the activated TCI states of the Panel#2 |
| 101 | a sixth TCI state among the activated TCI states of the Panel#2 |
| 110 | a seventh TCI state among the activated TCI states of the Panel#2 |
| 111 | an eighth TCI state among the activated TCI states of the Panel#2 |

The third preset mapping relationship may be exemplified as shown in Table-4.

TABLE 4

| Beam indication codeword | TCI state number |
|---|---|
| 000 | a first TCI state among the activated TCI states of the Panel#1 and a first TCI state among the activated TCI states of the Panel#2 |
| 001 | a second TCI state among the activated TCI states of the Panel#1 and a second TCI state among the activated TCI states of the Panel#2 |
| 010 | a third TCI state among the activated TCI states of the Panel#1 and a third TCI state among the activated TCI states of the Panel#2 |
| 011 | a fourth TCI state among the activated TCI states of the Panel#1 and a fourth TCI state among the activated TCI states of the Panel#2 |
| 100 | a fifth TCI state among the activated TCI states of the Panel#1 and a fifth TCI state among the activated TCI states of the Panel#2 |
| 101 | a sixth TCI state among the activated TCI states of the Panel#1 and a sixth TCI state among the activated TCI states of the Panel#2 |
| 110 | a seventh TCI state among the activated TCI states of the Panel#1 and a seventh TCI state among the activated TCI states of the Panel#2 |
| 111 | an eighth TCI state among the activated TCI states of the Panel#1 and an eighth TCI state among the activated TCI states of the Panel#2 |

If the information element in the MAC signaling received by the terminal indicates activation of the panel #1, the terminal searches in the first preset mapping relationship shown in Table-2 above, and obtains a temporary Table-5 (the third column in Table-5 changes with the change of the TCI state activated by the MAC) in combination with the TCI state corresponding to each antenna panel activated by the MAC signaling, and acquires, from Table-5, the TCI state corresponding to the beam indication codeword carried in the DCI as the target TCI state corresponding to the panel #1. If the information element in the MAC signaling received by the terminal indicates activation of the panel #2, the terminal searches in the second preset mapping relationship shown in Table-3 above, and obtains a temporary Table-6 (the third column in Table-6 will change with the change of the TCI state activated by the MAC) in combination with the TCI state corresponding to each antenna panel activated by the MAC signaling, and acquires, from Table-6, the TCI state corresponding to the beam indication codeword carried in the DCI as the target TCI state corresponding to the panel #2. If the information element in the MAC signaling received by the terminal indicates activation of the panel #1 and the panel #2, the terminal searches in the third preset mapping relationship shown in Table-4 above, obtains a temporary Table-7 (the third column in Table-7 will change with the change of the TCI state activated by the MAC) in combination with the TCI state corresponding to each antenna panel activated by the MAC signaling, and acquires, from Table-7, the TCI state combination corresponding to the beam indication codeword carried in the DCI as the target TCI state corresponding to the panel #1 and the target TCI state corresponding to the panel #2.

Table-5 is exemplary as follows.

TABLE 5

| Beam indication codeword | TCI state number | Note: actual TCI state |
|---|---|---|
| 000 | a first TCI state among the activated TCI states of the Panel#1 | TCI#0 |
| 001 | a second TCI state among the activated TCI states of the Panel#1 | TCI#3 |
| 010 | a third TCI state among the activated TCI states of the Panel#1 | TCI#6 |
| 011 | a fourth TCI state among the activated TCI states of the Panel#1 | TCI#14 |
| 100 | a fifth TCI state among the activated TCI states of the Panel#1 | TCI#20 |
| 101 | a sixth TCI state among the activated TCI states of the Panel#1 | TCI#23 |
| 110 | a seventh TCI state among the activated TCI states of the Panel#1 | TCI#26 |
| 111 | an eighth TCI state among the activated TCI states of the Panel#1 | TCI#44 |

Table-6 is exemplary as follows.

TABLE 6

| Beam indication codeword | TCI state number | Note: actual TCI state |
| --- | --- | --- |
| 000 | a first TCI state among the activated TCI states of the Panel#2 | TCI#(N + 1) |
| 001 | a second TCI state among the activated TCI states of the Panel#2 | TCI#(N + 4) |
| 010 | a third TCI state among the activated TCI states of the Panel#2 | TCI#(N + 7) |
| 011 | a fourth TCI state among the activated TCI states of the Panel#2 | TCI#(N + 12) |
| 100 | a fifth TCI state among the activated TCI states of the Panel#1 | TCI#(N + 21) |
| 101 | a sixth TCI state among the activated TCI states of the Panel#2 | TCI#(N + 24) |
| 110 | a seventh TCI state among the activated TCI states of the Panel#2 | TCI#(N + 37) |
| 111 | an eighth TCI state among the activated TCI states of the Panel#2 | TCI#(N + 42) |

Table-7 is exemplary as follows.

TABLE 7

| Beam indication codeword | TCI State Number | Note: Actual TCI state |
| --- | --- | --- |
| 000 | a first TCI state among the activated TCI states of the Panel#1 and a first TCI state among the activated TCI states of the Panel#2 | TCI#0&TCI#(N + 1) |
| 001 | a second TCI state among the activated TCI states of the Panel#1 and a second TCI state among the activated TCI states of the Panel#2 | TCI#3&TCI#(N + 4) |
| 010 | a third TCI state among the activated TCI states of the Panel#1 and a third TCI state among the activated TCI states of the Panel#2 | TCI#6&TCI#(N + 7) |
| 011 | a fourth TCI state among the activated TCI states of the Panel#1 and a fourth TCI state among the activated TCI states of the Panel#2 | TCI#14&TCI#(N + 12) |
| 100 | a fifth TCI state among the activated TCI states of the Panel#1 and a fifth TCI state among the activated TCI states of the Panel#2 | TCI#20&TCI#(N + 21) |
| 101 | a sixth TCI state among the activated TCI states of the Panel#1 and a sixth TCI state among the activated TCI states of the Panel#2 | TCI#23&TCI#(N + 24) |
| 110 | a seventh TCI state among the activated TCI states of the Panel#1 and a seventh TCI state among the activated TCI states of the Panel#2 | TCI#26&TCI#(N + 37) |
| 111 | an eighth TCI state among the activated TCI states of the Panel#1 and an eighth TCI state among the activated TCI states of the Panel#2 | TCI#44&TCI#(N + 42) |

In the above examples, description is made by only taking the length of the beam indication codeword carried in the DCI being 3 bits. The length of the beam indication codeword may also be 4 bits, 5 bits, 6 bits or even more. If the length of the beam indication codeword is greater than 3 bits, then when the information element in the MAC signaling indicates activation of the panel #1, several bits (such as lower 3 bits) in the beam indication codeword are configured to indicate the target TCI state corresponding to the panel #1; when the information element in the MAC signaling indicates activation of the panel #2, several bits (such as lower 3 bits or higher 3 bits) in the beam indication codeword are configured to indicate the target TCI state corresponding to the panel #2; and when the information element in the MAC signaling indicates activations of the panel #1 and the panel #2, all the bits in the beam indication codeword are configured to indicate the target TCI state corresponding to the panel #1 and the target TCI state corresponding to the panel #2.

For example, the length of the beam indication codeword is 6 bits, and when the information element indicates activation of the panel #1, the lowest 3 bits in the beam indication codeword may be configured to indicate the target TCI state corresponding to the panel #1; when the information element indicates activation of the panel #2, the lowest or highest 3 bits in the beam indication codeword may be configured to indicate the target TCI state corresponding to the panel #2; and when the information element indicates activations of the panel #1 and the panel #2, the lowest 3 bits may be configured to indicate the target TCI state corresponding to the panel #1, and the highest 3 bits may be configured to indicate the target TCI state corresponding to the panel #2. When the length of the beam indication codeword is 5 bits, 4 bits or 3 bits, 32, 16 or 8 TCI state combinations are predefined in the third preset mapping relationship, and each of the TCI state combinations includes a target TCI state corresponding to the panel #1 and a target TCI state corresponding to the panel #2.

In the embodiments of the present disclosure, an information element is added into the MAC signaling and the terminal is indicated of the antenna panel to be activated by using the information element. In this way, only minor modifications to the MAC signaling are required to realize the beam indication in the multi-antenna panel scenario. When the antenna panel used for data transmission is switched, the base station re-sends MAC signaling to the terminal, to indicate the antenna panel after the switching to the terminal through the MAC signaling, and further indicates, through the DCI, the target beam used when the antenna panel is used for data transmission.

In operation 204, the terminal determines, according to the target beam indication information corresponding to the target antenna panel, a corresponding target beam when data transmission is performed by using the target antenna panel.

In one possible implementation, the final activated target antenna panel is determined by the base station. The base station indicates in MAC signaling which one or more antenna panels are activated, and then the terminal activates the one or more antenna panels indicated by the base station. That is, the terminal activates all the to-be-activated antenna panels indicated by the MAC signaling. If the information element in the MAC signaling received by the terminal indicates activation of the panel #1, the terminal searches in the first preset mapping relationship to acquire the TCI state corresponding to the beam indication codeword carried in the DCI as the target TCI state corresponding to the panel #1, and then determines, according to the target TCI state, the corresponding first target beam when the data transmission is performed by using the panel #1. If the information element in the MAC signaling received by the terminal indicates activation of the panel #2, the terminal searches in the second preset mapping relationship to acquire the TCI state corresponding to the beam indication codeword carried in the DCI as the target TCI state corresponding to the panel #2, and then determines, according to the target TCI state, the corresponding second target beam when the data transmission is performed by using the panel #2. If the information element in the MAC signaling received by the terminal indicates activation of the panel #1 and the panel #2, the terminal searches in the third preset mapping relationship to acquire a TCI state combination corresponding to the beam indication codeword carried in the DCI as the target TCI state corresponding to the panel #1 and the target TCI state corresponding to the panel #2, and then determines, according to the target TCI state, the corresponding first target beam when the data transmission is performed by using the panel #1 and the corresponding second target beam when the data transmission is performed by using the panel #2.

Still taking the above example for description, it is assumed that the beam indication codeword included in the DCI is 000.

If the MAC signaling instructs the terminal to activate the panel #1, the terminal activates the panel #1, and searches in the Table-5 to acquire the TCI state corresponding to the beam indication codeword 000, which is the first TCI state among the activated TCI state of the Panel #1, that is, the TCI #0. Assuming that the RS corresponding to the TCI #0 is SSB index #1, the terminal determines to use the receiving beam used when receiving the SSB index #1 on the panel #1 as the target receiving beam for receiving the downlink data, to receive the downlink data sent from the base station.

If the panel #2 signaling instructs the terminal to activate the panel #2, the terminal activates the panel #2, and searches in the Table-6 to acquire the TCI state corresponding to the beam indication codeword 000, which is the first TCI state among the activated TCI states of the Panel #2, that is, the TCI #(N+1). Assuming that the RS corresponding to the TCI #(N+1) is SSB index #2, the terminal determines to use the receiving beam used when receiving the SSB index #2 on the panel #2 as the target receiving beam for receiving the downlink data, to receive the downlink data sent from the base station.

If the MAC signaling instructs the terminal to activate the panel #1 and the panel #2, the terminal activates the panel #1 and the panel #2, and searches in Table-7 to acquire the TCI state corresponding to the beam indication codeword 000, which is the first TCI state among the activated TCI states of the Panel #1 and the first TCI state among the activated TCI states of the Panel #2, that is, TCI #0 and TCI # (N+1), where TCI #0 belongs to the panel #1 and TCI # (N+1) belongs to the panel #2. Assuming that the RS corresponding to the TCI #0 is SSB index #1 and the RS corresponding to the TCI # (N+1) is SSB index #2, the terminal determines to use, the receiving beam used when the receiving the SSB index #1 on the panel #1 and the receiving beam used when receiving the SSB index #2 on the panel #2, as the target receiving beams for receiving the downlink data, to receive the downlink data sent by the base station.

In another possible implementation, although the base station activates multiple antenna panels through MAC signaling, the terminal may decide by itself whether to activate all of the multiple antenna panels or only a part of the multiple antenna panels.

For example, MAC signaling activates beam indication information corresponding to the first antenna panel and the second antenna panel, respectively, the first antenna panel and the second antenna panel are denoted panel #1 and panel #2. If the terminal activates only the first antenna panel, the terminal searches in a third preset mapping relationship to acquire target beam indication information corresponding to the first antenna panel, and determines a corresponding first target beam when data transmission is performed by using the first antenna panel. If the terminal activates only the second antenna panel, the terminal searches in a third preset mapping relationship to acquire target beam indication information corresponding to the second antenna panel, and determines a corresponding second target beam when the data transmission is performed by using the second antenna panel. If the terminal activates the first antenna panel and the second antenna panel, the terminal searches in a third preset mapping relationship to acquire target beam indication information corresponding to the first antenna panel and target beam indication information corresponding to the second antenna panel, and determines a corresponding first target beam when the data transmission is performed by using the first antenna panel and a corresponding second target beam when the data transmission is performed by using the second antenna panel.

Still taking the above example for description, assuming that the beam indication codeword included in the DCI is 000, the terminal searches in Table-7 to acquire the TCI state corresponding to the beam indication codeword 000, which is the first TCI state among the activated TCI states of the Panel #1 and the first TCI state among the activated TCI states of the Panel #2, i.e., TCI #0 and TCI # (N+1), and TCI #0 belongs to panel #1, TCI # (N+1) belongs to panel #2, assuming that the RS corresponding to the TCI #0 is SSB index #1, and the RS corresponding to the TCI # (N+1) is SSB index #2.

When the terminal activates only the panel #1, the terminal determines to use the receiving beam used when receiving the SSB index #1 on the panel #1 as the target receiving beam for receiving the downlink data, to receive the downlink data sent from the base station.

When the terminal activates only the panel #2, the terminal determines to use the receiving beam used when receiving the SSB index #2 on the panel #2 as the target receiving beam for receiving the downlink data, to receive the downlink data sent from the base station.

When the terminal activates the panel #1 and the panel #2, the terminal determines to use, the receiving beam used when the receiving the SSB index #1 on the panel #1 and the receiving beam used when receiving the SSB index #2 on the panel #2, as the target receiving beams for receiving the downlink data, to receive the downlink data sent by the base station.

In operation 205, the terminal performs data transmission with the base station by using the target beam corresponding to the target antenna panel.

When the beam indication information is in the TCI state, the terminal determines, according to the target TCI state corresponding to the target antenna panel, the target receiving beam used when the downlink data is received by using the target antenna panel, and then receives the downlink data by using the target receiving beam corresponding to the target antenna panel.

When the beam indication information is SRI, the terminal determines, according to the target SRI corresponding to the target antenna panel, the target transmitting beam used when the uplink data is sent by using the target antenna panel, and then sends the uplink data by using the target transmission beam corresponding to the target antenna panel.

In conclusion, in the technical solutions provided in the embodiments of the present disclosure, for a multi-antenna panel scenario, a base station sends MAC signaling and DCI to a terminal to indicate a corresponding target beam used by the terminal when the terminal performs the data transmission by using a target antenna panel, so that the terminal can select correct beams to perform the data transmission for different antenna panels, thereby improving the success rate of the data transmission in the multi-antenna panel scenario.

In addition, according to the technical solution provided in the embodiment of the present disclosure, data transmission between a terminal and a base station by using multiple beams simultaneously can be realized, and communication robustness can be improved.

In addition, in the technical solution provided in the embodiment of the present disclosure, it is possible to realize that the terminal selects by itself which antenna panel or antenna panels to activate, and the flexibility is high.

Optionally, the terminal includes a first antenna panel and a second antenna panel, which are denoted as panel #1 and panel #2. In another possible implementation, a first part of beam indication codewords in the preset mapping relationship are configured to indicate target beam indication information corresponding to the first antenna panel; a second part of beam indication codewords in the preset mapping relationship are configured to indicate target beam indication information corresponding to the second antenna panel; and a third part of beam indication codewords in the preset mapping relationship are configured to indicate target beam indication information corresponding to the first antenna panel and target beam indication information corresponding to the second antenna panel.

Still taking the above example for description, the preset mapping relationship may be exemplified as shown in Table-8.

TABLE 8

| Beam indication codeword | TCI State Number |
|---|---|
| 000 | a first TCI state among the activated TCI states of the Panel#1 |
| 001 | a second TCI state among the activated TCI states of the Panel#1 |
| 010 | a first TCI state among the activated TCI states of the Panel#2 |
| 011 | a second TCI state among the activated TCI states of the Panel#2 |
| 100 | a first TCI state among the activated TCI states of the Panel#1 and a first TCI state among the activated TCI states of the Panel#2 |
| 101 | a second TCI state among the activated TCI states of the Panel#1 and a second TCI state among the activated TCI states of the Panel#2 |
| 110 | a third TCI state among the activated TCI states of the Panel#1 and a first TCI state among the activated TCI states of the Panel#2 |
| 111 | an eighth TCI state among the activated TCI states of the Panel#1 and a third TCI state among the activated TCI states of the Panel#2 |

Where a first part of beam indication codewords include 000 and 001, and the two beam indication codewords are respectively configured to indicate one target TCI state corresponding to the panel #1; a second part of beam indication codewords include 010 and 011, and the two beam indication codewords are respectively used to indicate one target TCI state corresponding to the panel #2; a third part of beam indication codewords include 100, 101, 110, and 111, and the four beam indication codewords are respectively used to indicate a target TCI state combination. Each target TCI state combination includes a target TCI state corresponding to panel #1 and a target TCI state corresponding to panel #2.

After receiving the DCI sent from the base station and reading the beam indication codeword from the DCI, the terminal searches in the preset mapping relationship as shown in Table-8, and obtains a temporary Table-9 (the third column in Table-9 changes with the change of the TCI state activated by the MAC) in combination with the TCI state corresponding to each antenna panel activated by the MAC signaling, and then determines the target TCI state corresponding to the antenna panel to be activated by the base station.

TABLE 9

| Beam indication codeword | TCI State Number | Note: Actual TCI state |
|---|---|---|
| 000 | a first TCI state among the activated TCI states of the Panel#1 | TCI#0 |
| 001 | a second TCI state among the activated TCI states of the Panel#1 | TCI#3 |
| 010 | a first TCI state among the activated TCI states of the Panel#2 | TCI#(N + 1) |
| 011 | a second TCI state among the activated TCI states of the Panel#2 | TCI#(N + 4) |
| 100 | a first TCI state among the activated TCI states of the Panel#1 and a first TCI state among the activated TCI states of the Panel#2 | TCI#0 & TCI#(N + 1) |
| 101 | a second TCI state among the activated TCI states of the Panel#1 and a second TCI state among the activated TCI states of the Panel#2 | TCI#3 & TCI#(N + 4) |
| 110 | a third TCI state among the activated TCI states of the Panel#1 and a first TCI state among the activated TCI states of the Panel#2 | TCI#6 & TCI#(N + 1) |
| 111 | an eighth TCI state among the activated TCI states of the Panel#1 and a third TCI state among the activated TCI states of the Panel#2 | TCI#44 & TCI#(N + 7) |

Still taking the above example for description, assuming that the beam indication codeword included in the DCI is 000, the terminal searches in Table-9 to acquire the TCI state corresponding to the beam indication codeword 000, which is the first TCI state among the activated TCI states of the Panel #1, i.e., TCI #0. Since the TCI #0 belongs to the panel #1 and it is assumed that RS corresponding to the TCI #0 is SSB index #1, the terminal determines to use the receiving beam used when receiving the SSB index #1 on the panel #1 as the target receiving beam for receiving the downlink data.

For another example, assuming that the beam indication codeword included in the DCI is 100, the terminal searches in Table-9 to acquire the TCI state corresponding to the beam indication codeword 100, which is the first TCI state among the activated TCI states of the Panel #1 and the first TCI state among the activated TCI states of the Panel #2, i.e., TCI #0 and TCI # (N+1). Since the TCI #0 belongs to the panel #1, the TCI # (N+1) belongs to the panel #2, it is assumed that the RS corresponding to the TCI #0 is SSB index #1 and the RS corresponding to the TCI # (N+1) is SSB index #2, the terminal determines to use, the receiving beam used when the receiving the SSB index #1 on the panel #1 and the receiving beam used when receiving the SSB index #2 on the panel #2, as the target receiving beams for receiving the downlink data.

In this case, the final activated target antenna panel is determined by the base station. The base station indicates in MAC signaling which antenna panel or antenna panels are activated, and the terminal activates the indicated antenna panel or antenna panels.

In addition, in the above embodiments, description is made by only taking the beam indication codeword length being 3 bits, and the length of the beam indication codeword may be greater than or equal to 3 bits. Assuming that the terminal has two antenna panels, which are denoted as panel #1 and panel #2, and eight TCI states corresponding to each antenna panel are activated by MAC signaling, then there are 8 cases for the target TCI state corresponding to the panel #1 that is indicated by the beam indication codeword, there are 8 cases for the target TCI state corresponding to the panel #2 that is indicated by the beam indication codeword, and there are 8×8=64 cases for the target TCI states respectively corresponding to the panel #1 and the pane2# that are indicated by the beam indication codeword, so there are 8+8+64=80 cases in total. If the length of the beam indication codeword is 7 bits, all 80 cases may be included in the preset mapping relationship. If the length of the beam indication codeword is less than 7 bits, a quantity of cases can be selected from the above-described 80 cases and stored in the preset mapping relationship, where the quantity corresponds to the number of states capable of being indicated by the beam indication codeword (i.e., 2 to the power N, if the number of bits of the beam indication codeword is N). For example, when the length of the beam indication codeword is 6 bits, 64 cases of the above-described 80 cases are selected and stored in the preset mapping relationship; when the length of the beam indication codeword is 5 bits, 32 cases of the above-mentioned 80 cases are selected and stored in the preset mapping relationship; when the length of the beam indication codeword is 4 bits, 16 cases of the above-mentioned 80 cases are selected and stored in the preset mapping relationship; when the length of the beam indication codeword is 3 bits, 8 cases of the above-described 80 cases are selected and stored in the preset mapping relationship.

The following is an apparatus according to embodiments of the present disclosure, which may be configured to perform the method according to embodiments of the present disclosure. For details not disclosed in the apparatus embodiment of the present disclosure, refer to the method embodiment of the present disclosure.

Figure 3:
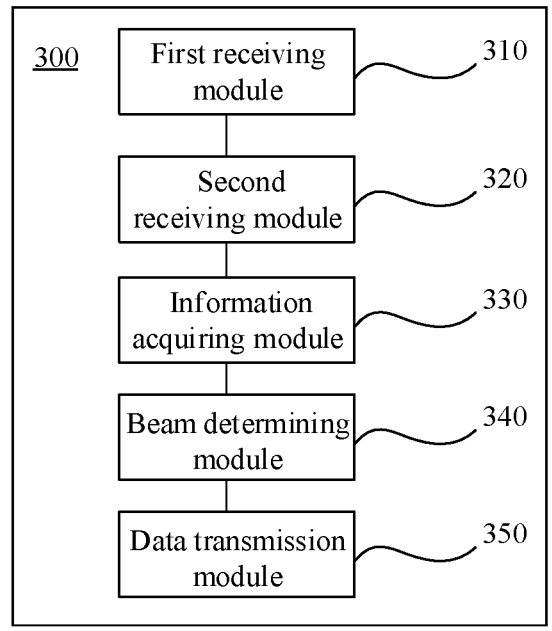
FIG. 3 is a block diagram of a data transmission apparatus according to an embodiment of the disclosure.

FIG. 3 is a block diagram of a data transmission apparatus according to an embodiment of the disclosure. The apparatus has a function of implementing the method embodiments on the terminal side described above. The function may be implemented by hardware, or may be implemented by hardware executing corresponding software. The apparatus may be the terminal described above, or may be provided in the terminal. The apparatus 300 may include a first receiving module 310, a second receiving module 320, an information acquiring module 330, a beam determining module 340, and a data transmission module 350.

The first receiving module 310 is configured to receive MAC signaling sent from a base station, the MAC signaling being configured to activate beam indication information respectively corresponding to n antenna panels, where the beam indication information corresponding to one of the n antenna panels is configured to indicate a corresponding beam when data transmission is performed by using the antenna panel, and the MAC signaling comprises an information element configured to instruct the terminal to activate the n antenna panels, where n is a positive integer.

The second receiving module 320 is configured to receive Downlink Control Information DCI sent from the base station, a beam indication codeword included in the DCI being configured to indicate target beam indication information respectively corresponding to the n antenna panels, where the target beam indication information corresponding to a target antenna panel included in the n antenna panels is one of multiple beam indication information corresponding to the target antenna panel activated by the MAC signaling.

The information obtaining module 330 is configured to search in a preset mapping relationship corresponding to the n antenna panels to acquire beam indication information corresponding to the beam indication codeword as the target beam indication information respectively corresponding to the n antenna panels.

The beam determining module 340 is configured to determine, according to the target beam indication information corresponding to the target antenna panel, a corresponding target beam when data transmission is performed by using the target antenna panel.

The data transmission module 350 is configured to perform data transmission with the base station by using the target beam corresponding to the target antenna panel.

In conclusion, in the technical solutions provided in the embodiments of the present disclosure, for a multi-antenna panel scenario, a base station sends MAC signaling and DCI to a terminal to indicate a corresponding target beam used by the terminal when the terminal performs the data transmission by using a target antenna panel, so that the terminal can select correct beams to perform the data transmission for different antenna panels, thereby improving the success rate of the data transmission in the multi-antenna panel scenario.

Optionally, the terminal includes a first antenna panel and a second antenna panel, and the terminal stores a first preset mapping relationship corresponding to the first antenna panel, a second preset mapping relationship corresponding to the second antenna panel and a third preset mapping relationship corresponding to the first antenna panel and the second antenna panel Any beam indication codeword in the first preset mapping relationship is configured to indicate target beam indication information corresponding to the first antenna panel.

Any beam indication codeword in the second preset mapping relationship is configured to indicate target beam indication information corresponding to the second antenna panel.

Any beam indication codeword in the third preset mapping relationship is configured to indicate the target beam indication information corresponding to the first antenna panel and the target beam indication information corresponding to the second antenna panel.

Optionally, the MAC signaling activates beam indication information respectively corresponding to the first antenna panel and the second antenna panel.

The information acquiring module 330 is configured to:

in response to that the terminal activates the first antenna panel, search in the third preset mapping relationship to acquire the target beam indication information corresponding to the first antenna panel;

or, in response to that the terminal activates the second antenna panel, search in the third preset mapping relationship to acquire the target beam indication information corresponding to the second antenna panel;

or, in response to that the terminal activates the first antenna panel and the second antenna panel, search in the third preset mapping relationship to acquire the target beam indication information corresponding to the first antenna panel and the target beam indication information corresponding to the second antenna panel.

Optionally, the terminal includes a first antenna panel and a second antenna panel.

A first part of beam indication codewords in the preset mapping relationship are configured to indicate target beam indication information corresponding to the first antenna panel.

A second part of beam indication codewords in the preset mapping relationship are configured to indicate target beam indication information corresponding to the second antenna panel.

A third part of beam indication codewords in the preset mapping relationship are configured to indicate target beam indication information corresponding to the first antenna panel and target beam indication information corresponding to the second antenna panel.

Optionally, a length of the beam indication codeword is greater than or equal to 3 bits.

Optionally, the beam indication information is a Transmission Configuration Indication (TCI) state, and a TCI state corresponding to the target antenna panel is configured to indicate a receiving beam used by the terminal when the terminal receives downlink data by using the target antenna panel;

or, the beam indication information is Spatial Relation Information (SRI), and SRI corresponding to the target antenna panel is configured to indicate a transmitting beam used by the terminal when the terminal sends uplink data by using the target antenna panel.

Figure 4:
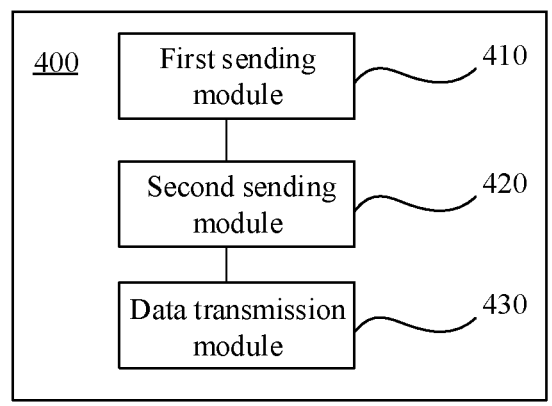
FIG. 4 is a block diagram of a data transmission apparatus according to another embodiment of the disclosure.

FIG. 4 is a block diagram of a downlink data transmission apparatus according to another embodiment of the disclosure. The apparatus has a function of implementing the method embodiments on the base station side described above. The function may be implemented by hardware, or may be implemented by hardware executing corresponding software. The apparatus may be a base station described above or may be provided in the base station. The apparatus 400 may include a first sending module 410, a second sending module 420, and a data transmission module 430.

The first sending module 410 is configured to send Media Access Control (MAC) signaling to a terminal, the MAC signaling being configured to activate beam indication information respectively corresponding to n antenna panels, where the beam indication information corresponding to one of the n antenna panels is configured to indicate a corresponding beam when data transmission is performed by using the antenna panel, and the MAC signaling comprises an information element configured to instruct the terminal to activate the n antenna panels, where n is a positive integer.

The second sending module 420 is configured to send DCI to the terminal, a beam indication codeword included in the DCI being configured to indicate target beam indication information respectively corresponding to the n antenna panels, where the target beam indication information corresponding to a target antenna panel included in the n antenna panels is one of multiple beam indication information corresponding to the target antenna panel activated by the MAC signaling.

The data transmission module 430 is configured to perform data transmission with the terminal by using the n antenna panels.

In conclusion, in the technical solutions provided in the embodiments of the present disclosure, for a multi-antenna panel scenario, a base station sends MAC signaling and DCI to a terminal to indicate a corresponding target beam used by the terminal when the terminal performs data transmission by using a target antenna panel, so that the terminal can select correct beams to perform the data transmission for different antenna panels, thereby improving the success rate of the data transmission in the multi-antenna panel scenario.

It is to be noted that when the apparatus provided in the above embodiments implements its functions, only the partitioning of each of the above functional modules is used as an example. In actual application, the above functions may be allocated to different functional modules according to actual needs, that is, the content structure partitioning of the apparatus is divided into different functional modules to complete all or part of the functions described above.

With respect to the apparatus in the above-described embodiments, the specific manner in which the respective modules perform operations has been described in detail in the embodiments of the method, and will not be described in detail herein.

An exemplary embodiment of the present disclosure further provides a data transmission apparatus capable of implementing the method provided by the present disclosure. The apparatus may be the terminal described above, or may be provided in the terminal. The apparatus includes a processor and a memory for storing instructions executable by the processor. The processor is configured to:

receive Media Access Control (MAC) signaling sent from a base station, the MAC signaling being configured to activate beam indication information respectively corresponding to n antenna panels, where the beam indication information corresponding to one of the n antenna panels is configured to indicate a corresponding beam when data transmission is performed by using the antenna panel, and the MAC signaling comprises an information element configured to instruct the terminal to activate the n antenna panels, where n is a positive integer;

receive Downlink Control Information (DCI) sent from the base station, a beam indication codeword included in the DCI being configured to indicate target beam indication information respectively corresponding to the n antenna panels, where the target beam indication information corresponding to a target antenna panel included in the n antenna panels is one of multiple beam indication information corresponding to the target antenna panel activated by the MAC signaling;

search in a preset mapping relationship corresponding to the n antenna panels to acquire beam indication information corresponding to the beam indication codeword as the target beam indication information respectively corresponding to the n antenna panels;

determine, according to the target beam indication information corresponding to the target antenna panel, a corresponding target beam when data transmission is performed by using the target antenna panel; and perform data transmission with the base station by using the target beam corresponding to the target antenna panel.

Optionally, the terminal includes a first antenna panel and a second antenna panel, and the terminal stores a first preset mapping relationship corresponding to the first antenna panel, a second preset mapping relationship corresponding to the second antenna panel and a third preset mapping relationship corresponding to the first antenna panel and the second antenna panel.

Any beam indication codeword in the first preset mapping relationship is configured to indicate target beam indication information corresponding to the first antenna panel.

Any beam indication codeword in the second preset mapping relationship is configured to indicate target beam indication information corresponding to the second antenna panel.

Any beam indication codeword in the third preset mapping relationship is configured to indicate the target beam indication information corresponding to the first antenna panel and the target beam indication information corresponding to the second antenna panel.

Optionally, signaling activates beam indication information respectively corresponding to the first antenna panel and the second antenna panel.

The processor is configured to:

in response to that the terminal activates the first antenna panel, search in the third preset mapping relationship to acquire the target beam indication information corresponding to the first antenna panel;

or, in response to that the terminal activates the second antenna panel, search in the third preset mapping relationship to acquire the target beam indication information corresponding to the second antenna panel;

or, in response to that the terminal activates the first antenna panel and the second antenna panel, search in the third preset mapping relationship to acquire the target beam indication information corresponding to the first antenna panel and the target beam indication information corresponding to the second antenna panel.

Optionally, the terminal includes a first antenna panel and a second antenna panel.

A first part of beam indication codewords in the preset mapping relationship are configured to indicate target beam indication information corresponding to the first antenna panel.

A s in the preset mapping relationship are configured to indicate target beam indication information corresponding to the second antenna panel.

A third part of beam indication codewords in the preset mapping relationship are configured to indicate target beam indication information corresponding to the first antenna panel and target beam indication information corresponding to the second antenna panel.

Optionally, a length of the beam indication codeword is greater than or equal to 3 bits.

Optionally, the beam indication information is a Transmission Configuration Indication (TCI) state, and a TCI state corresponding to the target antenna panel is configured to indicate a receiving beam used by the terminal when the terminal receives downlink data by using the target antenna panel;

or, the beam indication information is Spatial Relation Information (SRI), and SRI corresponding to the target antenna panel is configured to indicate a transmitting beam used by the terminal when the terminal sends uplink data by using the target antenna panel.

An exemplary embodiment of the present disclosure further provides a data transmission apparatus capable of implementing the method provided by the present disclosure. The apparatus may be a base station described above or may be provided in the base station. The apparatus includes a processor and a memory for storing instructions executable by the processor. The processor is configured to:

send Media Access Control (MAC) signaling to a terminal, the MAC signaling being configured to activate beam indication information respectively corresponding to n antenna panels, where the beam indication information corresponding to one of the n antenna panels is configured to indicate a corresponding beam when data transmission is performed by using the antenna panel, and the MAC signaling comprises an information element configured to instruct the terminal to activate the n antenna panels, where n is a positive integer;

send Downlink Control Information (DCI) to the terminal, a beam indication codeword included in the DCI being configured to indicate target beam indication information respectively corresponding to the n antenna panels, where the target beam indication information corresponding to a target antenna panel included in the n antenna panels is one of multiple beam indication information corresponding to the target antenna panel activated by the MAC signaling; and perform data transmission with the terminal by using the n antenna panels.

The solutions provided in the embodiments of the present disclosure are described above mainly from the perspective of interaction between a base station and a terminal. It will be understood that, in order to implement the above functions, the base station and the terminal include corresponding hardware structures and/or software modules for performing respective functions. Embodiments of the present disclosure can be implemented in hardware or a combination of hardware and computer software in combination with exemplary units and algorithm steps described in connection with the embodiments disclosed in the present disclosure. Whether a function is performed in hardware or computer software driven hardware depends on the particular application and design constraints of the technical solution. A person skilled in the art may implement the described functions using different methods for each particular application, but such implementation should not be considered beyond the scope of the technical solutions of the embodiments of the present disclosure.

Figure 5:
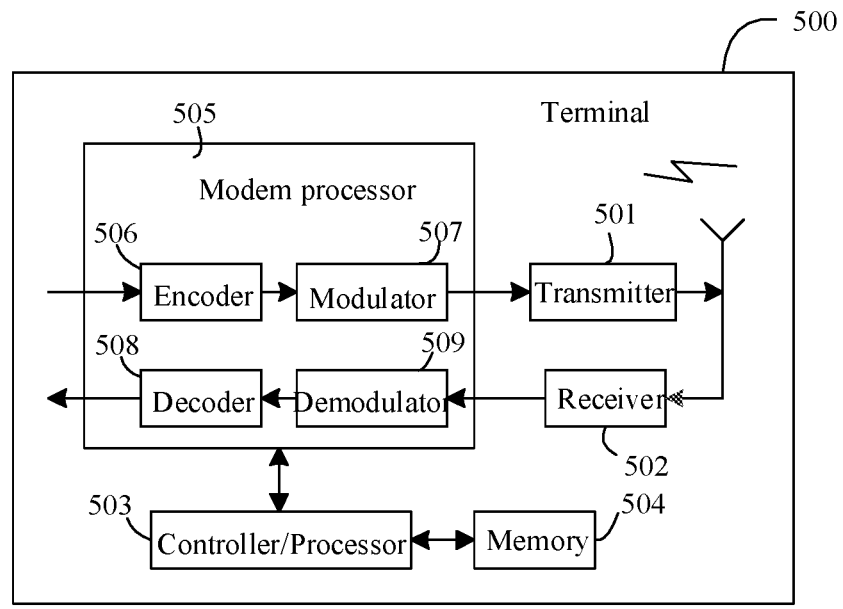
FIG. 5 is a schematic structural diagram of a terminal according to an embodiment of the disclosure.

FIG. 5 is a schematic structural diagram of a terminal according to an embodiment of the disclosure.

The terminal 500 includes a transmitter 501, a receiver 502, and a processor 503. The processor 503 may also be a controller, which is represented as "controller/processor 503" in FIG. 5. Optionally, the terminal 500 may further include a modem processor 505, the modem processor 505 may include a encoder 506, a modulator 507, a decoder 508, and a demodulator 509.

In an embodiment, transmitter 501 processes (e.g., analog conversion, filtering, amplifying, and up-conversion) the output samples and generates an uplink signal that is sent through an antenna to the base station described in the above-described embodiments. On the downlink, the antenna receives the downlink signal sent from the base station in the above-described embodiments. The receiver 502 adjusts (e.g., filtering, amplifying, doen-conversion, and digitizing) the signal received from the antenna and provides input samples. In the modem processor 505, the encoder 506 receives service data and signaling messages to be send on the uplink and processes the service data and signaling messages (e.g., formatting, encoding and interleaving). The modulator 507 further processes, e.g., symbol mapping and modulating, the encoded service data and the encoded signaling messages and provides output samples. Demodulator 509 processes, e.g., demodulating, the input samples and provides symbol estimates. The decoder 508 processes, for example, de-interleaving and decoding, the symbol estimates and provides the decoded data and decoded signaling messages sent to the terminal 500. The encoder 506, modulator 507, demodulator 509, and decoder 508 may be implemented by a combined modem processor 505. These units operate according to radio access technologies employed by radio access networks (e.g., access technologies of LTE and other evolved systems). It is to be noted that when the terminal 500 does not include the modem processor 505, the above-described functions of the modem processor 505 may also be implemented by the processor 503.

The processor 503 controls and manages the operation of the terminal 500, and is configured to perform the processing procedure performed by the terminal 500 in the embodiments of the present disclosure. For example, the processor 503 is further configured to perform the various operations on the terminal side in the method embodiments described above, and/or other operations of the technical solutions described in the embodiments of the present disclosure.

Furthermore, the terminal 500 may further include a memory 504 for storing program code and data for the terminal 500.

It will be appreciated that FIG. 5 shows only a simplified design of the terminal 500. In practical application, the terminal 500 may include any number of transmitters, receivers, processors, modems, modem processor and memory, etc., and all terminals that may implement embodiments of the present disclosure are within the protection scope of the embodiments of the present disclosure.

Figure 6:
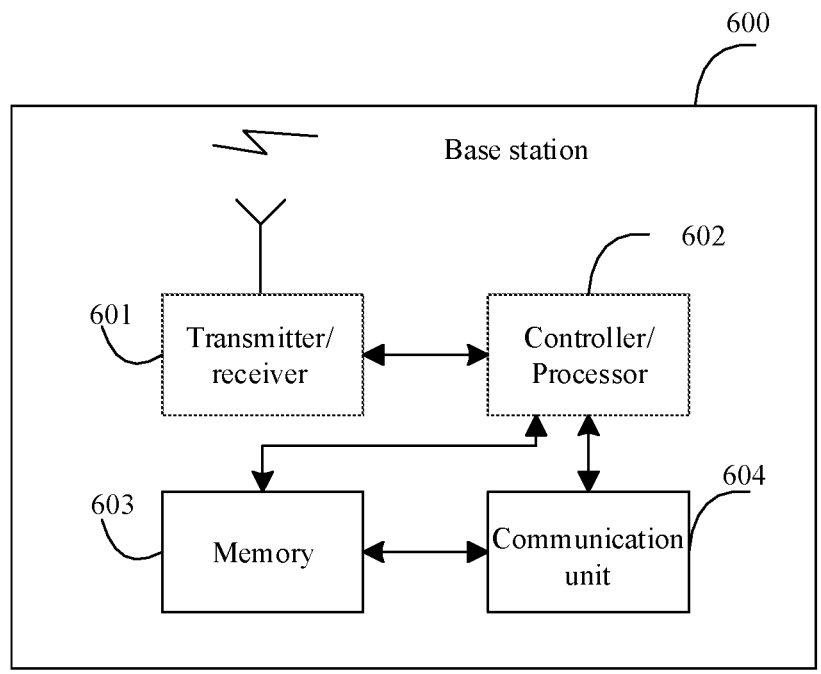
FIG. 6 is a schematic structural diagram of a base station according to an embodiment of the disclosure.

FIG. 6 is a schematic structural diagram of a base station according to an embodiment of the disclosure.

The base station 600 includes a transmitter/receiver 601 and a processor 602. The processor 602 may also be a controller, which is represented as "controller/processor 602" in FIG. 6. The transmitter/receiver 601 is configured to support information transmission between the base station and the terminal in the above-described embodiments, and to support communication between the base station and other network entities. The processor 602 performs various functions for communicating with the terminal. On the uplink, the uplink signal from the terminal is received through an antenna, demodulated (e.g., a high-frequency signal are demodulated into a baseband signal) by a receiver 601, and further processed by a processor 602 to recover the service data and signaling messages sent from the terminal. On the downlink, service data and signaling messages are processed by processor 602 and modulated (e.g., a baseband signal is modulated into high frequency signal) by transmitter 601 to produce downlink signal and downlink signal is send to the terminal through an antenna. It is to be noted that the demodulation or modulation functions described above may also be performed by the processor 602. For example, the processor 602 is further configured to perform various operations on the base station side in the method embodiments described above, and/or other operations of the technical solutions described in the embodiments of the present disclosure.

Further, the base station 600 may further include a memory 603 for storing program code and data of the base station 600. In addition, the base station 600 may further include a communication unit 604. The communication unit 604 is configured to support the base station 600 in communicating with other network entities, such as network devices in a core network. For example, in a 5G NR system, the communication unit 604 may be an NG-U interface for supporting the base station 600 to communicate with a User Plane Function (UPF) entity; alternatively, the communication unit 604 may be a NG-C interface for supporting the base station 600 to communicate with an Access and Mobility Management Function (AMF) entity.

It will be appreciated that FIG. 6 shows only a simplified design of the base station 600. In practical application, the base station 800 may include any number of transmitters, receivers, processors, controllers, memories, communication units, etc., and all base stations that may implement embodiments of the present disclosure are within the scope of protection of the embodiments of the present disclosure.

Embodiments of the present disclosure further provide a non-transitory computer-readable storage medium having stored thereon a computer program that, when executed by a processor of a terminal, implements data transmission method on the terminal side as described above.

Embodiments of the present disclosure further provide a non-transitory computer-readable storage medium having stored thereon a computer program that, when executed by a processor of a base station, implements data transmission method on the base station side as described above.

It is to be understood that the reference to "multiple" herein refers to two or more. The term "and/or," as used herein, is merely an association that describes an associated object, meaning that there may be three relationships, e.g., A and/or B, which may mean that A alone, both A and B, and B alone, are present. In addition, the character "/" generally indicates that the associated object is an "or".

Other embodiments of the present disclosure will be readily contemplated by those skilled in the art after considering the specification and practicing the invention disclosed herein. The present application is intended to cover any variations, uses, or adaptations of the present disclosure that follow the general principles of the present disclosure and include well-known common sense or customary technical means in the art that are not disclosed in the present disclosure. The specification and embodiments are considered exemplary only, and the true scope and spirit of the present disclosure are indicated by the following claims.

It is to be understood that the present disclosure is not limited to the precise structure already described above and shown in the accompanying drawings, and various modifications and changes may be made without departing from its scope. The scope of the present disclosure is limited only by the appended claims.

The invention claimed is:

1. A method for data transmission, comprising:
receiving, by a terminal, Media Access Control (MAC) signaling sent from a base station, wherein the MAC signaling is configured to activate beam indication information respectively corresponding to n antenna panels, wherein the beam indication information corresponding to one of the n antenna panels is configured to indicate a corresponding beam when data transmission is performed by using an antenna panel, and wherein the MAC signaling has an information element added and configured to instruct the terminal to activate the n antenna panels, wherein n is a positive integer;
receiving, by the terminal, Downlink Control Information (DCI) sent from the base station, wherein the DCI comprises a beam indication bit group that is configured to indicate target beam indication information respectively corresponding to the n antenna panels, wherein the n antenna panels comprise the target beam indication information corresponding to a target antenna panel that comprises one of a plurality of beam indication information corresponding to the target antenna panel activated by the MAC signaling;
searching, by the terminal, in a preset mapping relationship corresponding to the n antenna panels for beam indication information corresponding to the beam indication bit group as the target beam indication information respectively corresponding to the n antenna panels;
determining, by the terminal and according to the target beam indication information corresponding to the target antenna panel, a corresponding target beam when data transmission is performed by using the target antenna panel; and performing, by the terminal, data transmission with the base station by using the target beam corresponding to the target antenna panel, wherein the terminal comprises a first antenna panel and a second antenna panel, wherein a first part of beam indication bit groups in the preset mapping relationship are configured to indicate target beam indication information corresponding to the first antenna panel;

wherein a second part of beam indication bit groups in the preset mapping relationship are configured to indicate target beam indication information corresponding to the second antenna panel; and wherein a third part of beam indication bit groups in the preset mapping relationship are configured to indicate target beam indication information corresponding to the first antenna panel and target beam indication information corresponding to the second antenna panel.

2. The method of claim 1, wherein a length of the beam indication bit group is greater than or equal to 3 bits.

3. The method of claim 2, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

4. The method of claim 1, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

5. A non-transitory computer-readable storage medium having stored thereon computer executable instructions that, when executed by one or more processors, cause the one or more processors to implement the method of claim 1.

6. The non-transitory computer-readable storage medium of claim 5, wherein a length of the beam indication bit group is greater than or equal to 3 bits.

7. The non-transitory computer-readable storage medium of claim 6, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

8. The non-transitory computer-readable storage medium of claim 5, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

9. A method for data transmission, comprising:

sending, by a base station, Media Access Control (MAC) signaling to a terminal, wherein the MAC signaling is configured to activate beam indication information respectively corresponding to n antenna panels, wherein the beam indication information corresponding to one of the n antenna panels is configured to indicate a corresponding beam when data transmission is performed by using an antenna panel, and wherein the MAC signaling has an information element added and configured to instruct the terminal to activate the n antenna panels, wherein n is a positive integer;

sending, by the base station, Downlink Control Information (DCI) to the terminal, wherein the DCI comprises a beam indication bit group that is configured to indicate target beam indication information respectively corresponding to the n antenna panels, wherein the n antenna panels comprise the target beam indication information corresponding to a target antenna panel that comprises one of a plurality of beam indication information corresponding to the target antenna panel activated by the MAC signaling;

searching, by the terminal, in a preset mapping relationship corresponding to the n antenna panels to acquire beam indication information corresponding to the beam indication bit group as the target beam indication information respectively corresponding to the n antenna panels;

determining, by the terminal, according to the target beam indication information corresponding to the target antenna panel, a corresponding target beam when data transmission is performed by using the target antenna panel; and performing, by the terminal, data transmission with the base station by using the target beam corresponding to the target antenna panel, wherein the terminal comprises a first antenna panel and a second antenna panel, wherein a first part of beam indication bit groups in the preset mapping relationship are configured to indicate target beam indication information corresponding to the first antenna panel;

wherein a second part of beam indication bit groups in the preset mapping relationship are configured to indicate target beam indication information corresponding to the second antenna panel; and wherein a third part of beam indication bit groups in the preset mapping relationship are configured to indicate target beam indication information corresponding to the first antenna panel and target beam indication information corresponding to the second antenna panel.

10. A data transmission apparatus, applied to a base station and a terminal, comprising:

one or more processors;

a non-transitory computer-readable storage medium storing instructions executable by the one or more processors, wherein the one or more processors are configured to implement the method of claim 9.

11. A non-transitory computer-readable storage medium having stored thereon computer executable instructions that, when executed by one or more processors, cause the one or more processors to implement the method of claim 8.

12. The non-transitory computer-readable storage medium of claim 11, wherein a length of the beam indication bit group is greater than or equal to 3 bits.

13. The non-transitory computer-readable storage medium of claim 11, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

14. The method of claim 9, wherein a length of the beam indication bit group is greater than or equal to 3 bits.

15. The method of claim 14, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

16. The method of claim 9, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

17. An apparatus, comprising:
one or more processors; and
a non-transitory computer-readable storage medium storing instructions executable by the one or more processors, wherein the one or more processors are configured to:
receive Media Access Control (MAC) signaling sent from a base station, wherein the MAC signaling is configured to activate beam indication information respectively corresponding to n antenna panels, wherein the beam indication information corresponding to one of the n antenna panels is configured to indicate a corresponding beam when data transmission is performed by using an antenna panel, and wherein the MAC signaling has an information element added and configured to instruct the terminal to activate the n antenna panels, wherein n is a positive integer;
receive Downlink Control Information DCI sent from the base station, wherein the DCI comprises a beam indication bit group that is configured to indicate target beam indication information respectively corresponding to the n antenna panels, wherein the n antenna panels comprise the target beam indication information corresponding to a target antenna panel that comprises one of a plurality of beam indication information corresponding to the target antenna panel activated by the MAC signaling;
search in a preset mapping relationship corresponding to the n antenna panels for beam indication information corresponding to the beam indication bit group as the target beam indication information respectively corresponding to the n antenna panels;
determine, according to the target beam indication information corresponding to the target antenna panel, a corresponding target beam when data transmission is performed by using the target antenna panel; and
perform data transmission with the base station by using the target beam corresponding to the target antenna panel,
wherein the terminal comprises a first antenna panel and a second antenna panel,
wherein a first part of beam indication bit groups in the preset mapping relationship are configured to indicate target beam indication information corresponding to the first antenna panel;
wherein a second part of beam indication bit groups in the preset mapping relationship are configured to indicate target beam indication information corresponding to the second antenna panel; and
wherein a third part of beam indication bit groups in the preset mapping relationship are configured to indicate target beam indication information corresponding to the first antenna panel and target beam indication information corresponding to the second antenna panel.

18. The apparatus of claim 17, wherein a length of the beam indication bit group is greater than or equal to 3 bits.

19. The apparatus of claim 18, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

20. The apparatus of claim 17, wherein the beam indication information is a Transmission Configuration Indication (TCI) state, and a TCI state corresponding to the target antenna panel is configured to indicate a receiving beam used by the terminal when the terminal receives downlink data by using the target antenna panel; or the beam indication information is Spatial Relation Information (SRI), and SRI corresponding to the target antenna panel is configured to indicate a transmitting beam used by the terminal when the terminal sends uplink data by using the target antenna panel.

* * * * *